W. D. FELKEL.
CULTIVATOR.
APPLICATION FILED OCT. 30, 1911.

1,059,133.

Patented Apr. 15, 1913.
2 SHEETS—SHEET 1.

WITNESSES:
W. A. Williams
Francis S. Maguire

INVENTOR
William D. Felkel.
BY
Luis H. David
Attorney

W. D. FELKEL.
CULTIVATOR.
APPLICATION FILED OCT. 30, 1911.
1,059,133.
Patented Apr. 15, 1913.
2 SHEETS—SHEET 2.
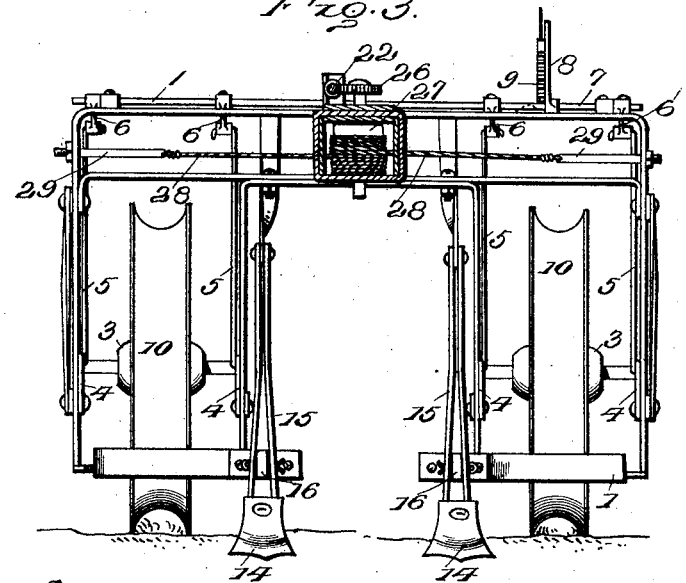
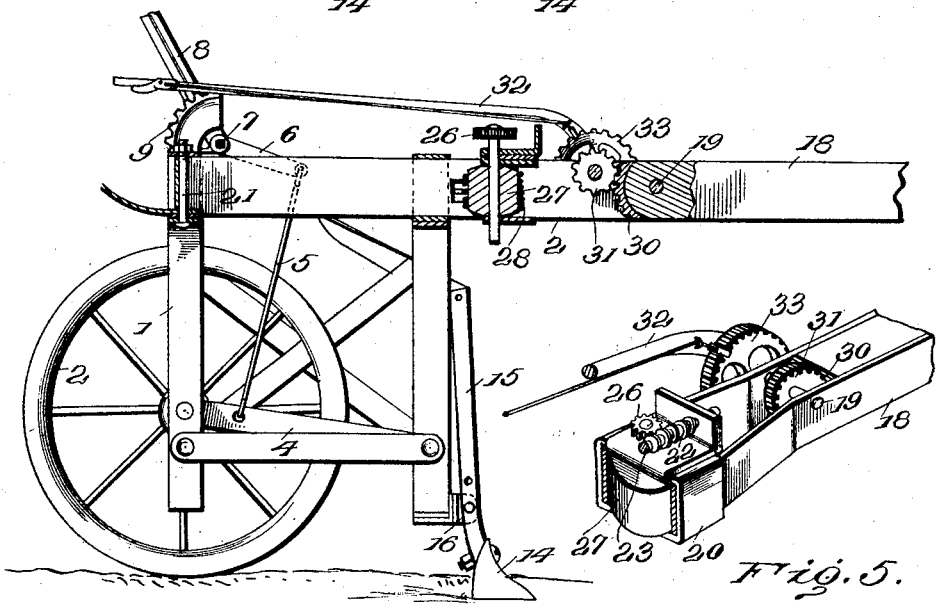
WITNESSES:
INVENTOR
William D. Felkel.
BY
Attorney

UNITED STATES PATENT OFFICE.

WILLIAM D. FELKEL, OF ELLOREE, SOUTH CAROLINA.

CULTIVATOR.

1,059,133. Specification of Letters Patent. Patented Apr. 15, 1913.

Application filed October 30, 1911. Serial No. 657,554.

*To all whom it may concern:*

Be it known that I, WILLIAM D. FELKEL, of Elloree, in the county of Orangeburg and State of South Carolina, have invented certain new and useful Improvements in Cultivators; and I do hereby declare the following to be a full, clear, and exact description of the invention, such as will enable others skilled in the art to which it appertains to make and use the same.

This invention relates to wheel-cultivators of the straddle-row type, and the objects are, first, to provide an exceedingly simple and comparatively inexpensive cultivator; secondly, one capable of cultivating curved or irregular rows as well as straight rows; third, one capable of plowing the earth close to a fence and to the entire end of a row or field; fourth, to enable the plow points to be readily lifted without undue strain on the operator; and fifth to guard against slipping or undue sinking in soft soil.

The invention will be hereinafter fully set forth and particularly pointed out in the claims.

Figure 1:
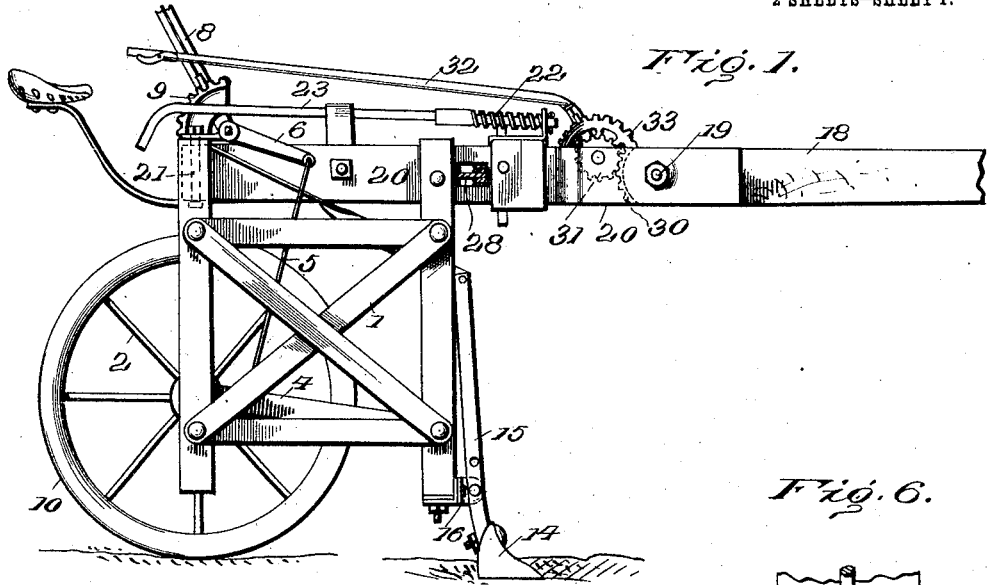
Figure 6:
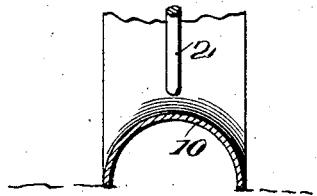
Figure 2:
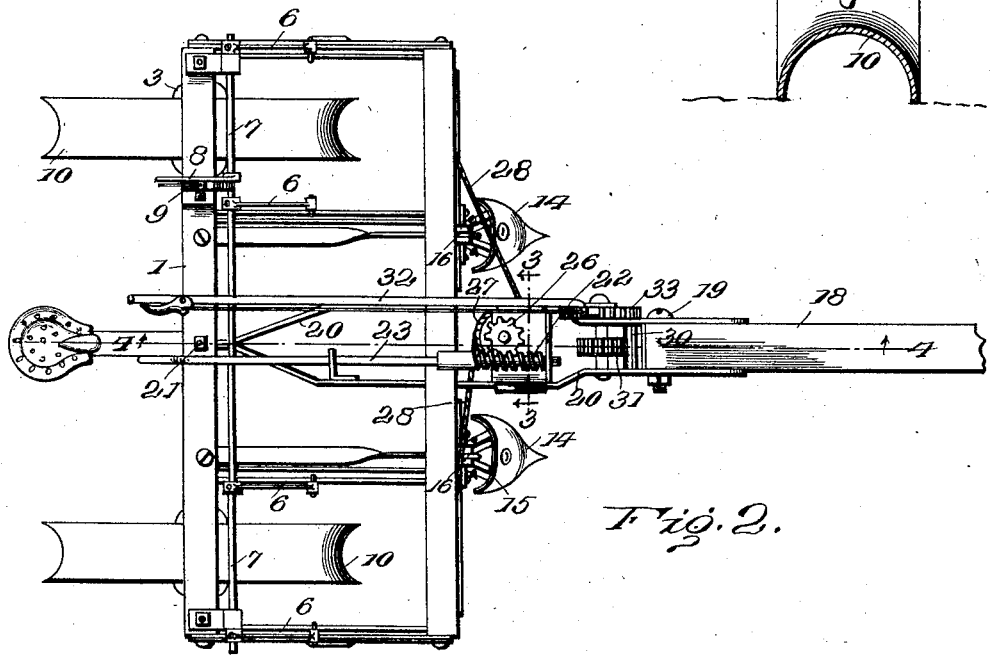

In the accompanying drawings Figure 1 is a view in side elevation. Fig. 2 is a plan view. Fig. 3 is a front end view. Fig. 4 is a section on line 4—4 Fig. 2. Fig. 5 is an enlarged view of the means for raising the plows. Fig. 6 is an enlarged sectional view of one of the carrying wheels.

Referring to the drawings, 1 designates a frame of known construction, of the straddle-row variety; 2 the carrying wheels whose axles 3 are journaled in the rear ends of pivoted arms 4 which are suspended by links 5 from arms 6 of a rock shaft 7 which may be turned by a lever 8 normally held locked to a rack 9 mounted on frame 1. By turning this shaft the positions of the wheels relatively to the frame may be regulated. The rim 10 of each wheel is concaved in cross section, as clearly shown in Fig. 6. This prevents the wheel from skidding or sinking to too great a depth in soft soil.

I have shown ordinary plows 14 mounted on the lower ends of standards 15 which are adjustably held to plates 16, which in turn are adjustably secured to the lower front portions of frame 1 at points forward of the carrying wheels. Any form of plow or cultivator tooth may be employed, thus rendering the machine capable of being used in all seasons of the year. The means for securing the standards to the main frame may be widely varied.

18 designates the draft pole which is connected by a horizontal pivot at 19 to a frame 20, which in turn is connected by a vertical pivot 21 to the upper rear portion of frame 1.

To enable the cultivator to work uneven or curved rows and close up against a terrace or side fence, I provide means within easy control of the operator for swinging the main frame laterally, thus enabling the horses to continue on straight lines while the plows are working at an angle to the line of draft. The means employed for this purpose preferably comprises a worm 22 on a crank rod 23 mounted in suitable bearings on the top of the main frame, the cranked end being adjacent to the driver's seat. This worm meshes with a worm wheel 26 on the upper end of the shaft of a vertically disposed drum 27 carried by the pole frame and around which is passed a cable 28, the opposite ends of which are connected by adjustable bolts 29 to the sides of frame 1 at the front thereof. By turning the worm shaft a relative movement is effected between the cultivator frame and the pole frame, and in this way the plow points may be caused to work toward either the right or the left of the line of draft. It will be noticed that in effecting this relative movement no weight or strain is placed upon the operator beyond what is necessary to turn the worm shaft.

To enable the plow points to be thrown out of the ground at the end of a row or field, I provide for tilting the front end of the frame relative to the pole, that is to say, for swinging the frame about the horizontal pivot which connects the pole to its frame. For this purpose I have shown a segmental rack 30 on the rear end of the pole, and in mesh therewith a pinion 31 whose shaft carries a lever 32, which in turn is equipped with an ordinary locking dog for engaging a second rack 33 mounted on the pole frame. Normally this lever occupies an upright position, but at the end of travel, the operator by bearing downwardly on the lever effects a movement of the cultivator frame relatively to the pole, and thus the plow points are raised from the ground. This is capable of being accomplished without the necessity of stopping the machine and does not require the successive raising of the plows.

The advantages of my invention will be readily appreciated. By locating the plows in front of the carrying wheels I am enabled to work clear out to a fence or a ditch or close to trees; and by swinging the main frame laterally I can work uneven rows as well as close to a side fence. The steering of the machine is easily effected by the operator. By locating the plow points in front of the wheels and effecting a relative movement between the frame and the pole the plows may be simultaneously lifted by a single lever.

It will be understood that changes may be made in the construction and operation of the parts without departing from the spirit of my invention.

I claim as my invention:

1. A straddle row cultivator comprising a main frame, a draft pole, a second frame to which said draft pole is secured, said second frame at its rear end being pivoted to the main frame and means for effecting a relative lateral angular movement between said main frame and the pole frame, such means comprising worm-gearing mounted on the pole frame and a cable engaging said worm-gearing and connected to said main frame.

2. A straddle row cultivator comprising a main frame, carrying wheels therefor, such main frame projecting forwardly of the axis of said carrying wheels, plows carried by said frame located forwardly of said carrying wheels, a draft pole, a pole frame pivoted to said main frame above the axle of the carrying wheels and to which said draft pole is secured, means for effecting a relative lateral movement between said main frame and the pole frame, such means comprising a drum carried by said pole frame, a cable encircling said drum and connected to said main frame, means for rotating said drum, and means for effecting a relative movement between said pole and its frame to raise the plows.

3. A straddle row cultivator comprising a main frame, a draft pole, a second frame to which said draft pole is secured, and means for effecting a relative movement between said main frame and the pole and its frame, such means comprising a drum, carried by said pole frame, a cable encircling said drum and connected at its ends to said main frame, a worm wheel carried by said drum, a shaft mounted on the top of said main frame, and a worm carried by said shaft and meshing with said wheel.

4. A straddle row cultivator, comprising in combination, a main frame having plow points, a draft pole, a second frame pivoted to the first mentioned frame and between which said frames there is a relative lateral movement, said draft pole being pivoted to said second frame, means carried by said second frame engaging said draft pole for vertically adjusting the frames relatively to the pole, said means comprising a rack carried by said pole, a pinion for engaging said rack, a lever for operating said pinion, and means for effecting a relative movement between the main frame and said second frame.

5. A straddle row cultivator, comprising in combination, a main frame having plow points, a draft pole, a second frame pivoted to the first mentioned frame and between which frames there is a relative lateral angular movement, said draft pole being pivoted to said second frame, means carried by said second frame engaging said draft pole for adjusting the frames relatively to the pole, and means for effecting a relative movement between the main frame and said second frame, said last mentioned means comprising a drum carried by said second frame, a cable encircling said drum and secured to said main frame, and worm-gearing for rotating said drum.

6. A straddle row cultivator comprising, in combination, a main frame having plow points, a draft pole, a second frame pivoted to the first mentioned frame and between which frames there is a relative lateral movement, means carried by said second frame engaging said draft pole for adjusting the frames relatively to the pole, said means comprising a rack carried by said pole, a pinion for engaging said rack, and a lever for operating said pinion, and means for effecting a relative movement between the main frame and said second frame, said last mentioned means comprising a drum carried by said second frame, a cable encircling said drum and secured to said main frame, and worm-gearing for rotating said drum.

In testimony whereof, I have signed this specification in the presence of two subscribing witnesses.

WILLIAM D. FELKEL.

Witnesses:
D. T. EVANS,
E. F. ULMER.